No. 784,180. PATENTED MAR. 7, 1905.
J. ROCKE.
PORTABLE GRAIN DUMP AND ELEVATOR.
APPLICATION FILED MAY 27, 1904.
2 SHEETS—SHEET 1.
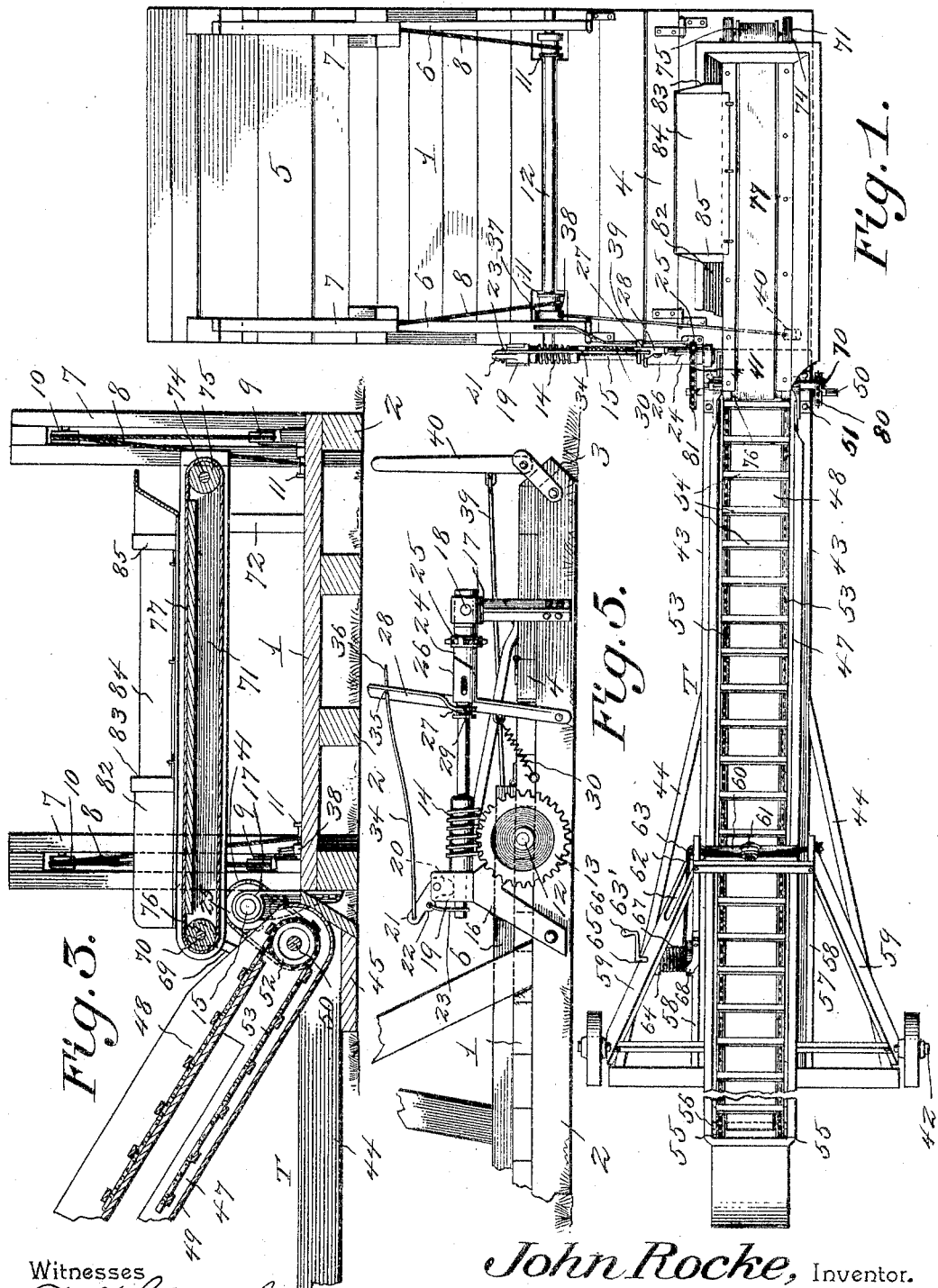
John Rocke, Inventor.

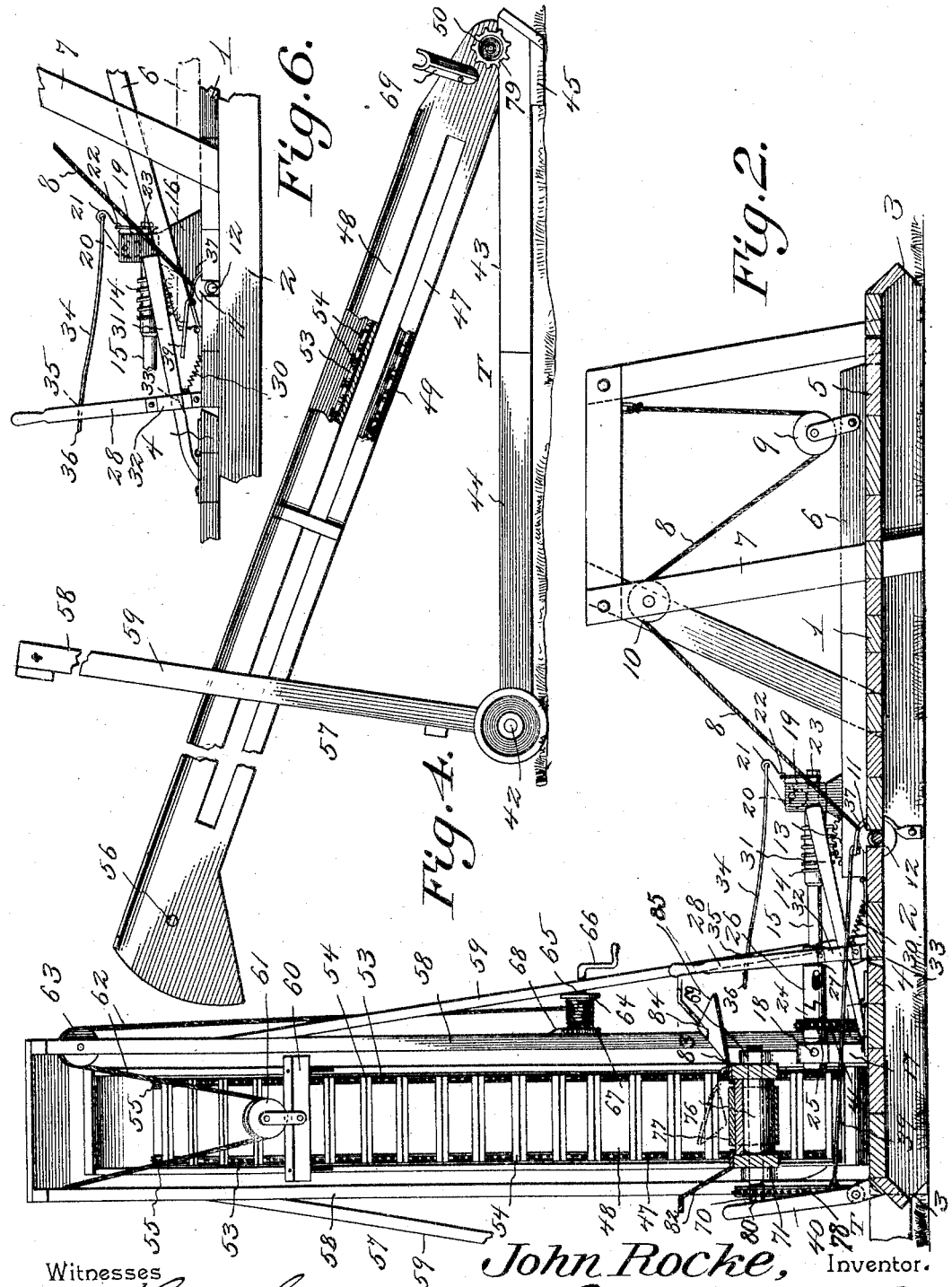

No. 784,180. Patented March 7, 1905.

UNITED STATES PATENT OFFICE.

JOHN ROCKE, OF MEADOWS, ILLINOIS.

PORTABLE GRAIN DUMP AND ELEVATOR.

SPECIFICATION forming part of Letters Patent No. 784,180, dated March 7, 1905.

Application filed May 27, 1904. Serial No. 210,119.

*To all whom it may concern:*

Be it known that I, JOHN ROCKE, a citizen of the United States, residing at Meadows, in the county of McLean and State of Illinois, have invented a new and useful Portable Grain Dump and Elevator, of which the following is a specification.

This invention relates to an improved portable grain dump and elevator such as are used for unloading and discharging grain from wagons and for elevating the same into a bin, granary, or other place of storage.

The present invention may be described as an improvement on the device of this class for which Letters Patent of the United States No. 721,466 were granted to myself on the 24th day of February, 1903. In said patent were included a wheel-supported platform, an elevator extending longitudinally alongside said platform, a receiving-trough having an endless carrier and connected pivotally with the lower end of the elevator-casing, and means for operating the dumping-trap in the platform and the endless carriers. By my present invention the main platform is mounted upon runners and is therefore elevated above the ground only a few inches, making it much easier for the teams to haul loaded wagons thereon. The endless carrying-mechanism, including the elevator and the hinged trough, are mounted separately upon a wheel-supported truck and may be conveniently handled independently of the platform. Again, means are provided whereby operating mechanism of the tilting or dumping trap of the platform when the latter is elevated to a certain predetermined height shall be thrown out of gear, thus retaining the trap and the wagon, the front wheels of which are supported thereon, in a position which is sufficiently tilted to discharge the contents of the wagon-box without interfering with the operation of the elevating and carrying mechanism, which continues until the load has been elevated and while the empty wagon is driven off the platform.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being understood, however, that no limitation is necessarily made to the precise structural details therein exhibited, but that the right is reserved to any changes, alterations, and modifications which come fairly within the scope of the invention and which may be resorted to without departing from the spirit or sacrificing the efficiency of the same.

In said drawings, Figure 1 is a top plan view showing the invention in operative position. Fig. 2 is a longitudinal sectional view taken through the main platform and looking in the direction of the elevator. Fig. 3 is a transverse sectional view taken through the platform, the lower part of the elevator, and the carrier-trough hingedly connected with the latter. Fig. 4 is a side elevation, partly in section, of the carrying and elevating mechanism disconnected from the platform. Fig. 5 is a detail view in elevation of part of the mechanism of the device. Fig. 6 is a detail view showing the tilting trap partially elevated and about to engage the trip mechanism whereby the means for operating said tilting trap is thrown out of gear.

Corresponding parts in the several figures are indicated by similar numerals of reference.

The main platform 1 of this improved device is supported upon skids or runners 2 2, of which any desired number may be used, the platform comprising a plurality of flooring-planks of suitable dimensions nailed upon or otherwise suitably connected to said runners. At the ends of the platform the runners are provided with inclines 3 to enable wagons to be conveniently driven onto the platform without necessity of hingedly connected or detachable driveways, such as were shown in my former patent above referred to. A flooring-plank 4 at a suitable distance from the "front" end of the platform (by which is meant the end at which the loaded wagons are driven upon the platform) is hingedly connected with an adjacent plank, as shown in my former patent and for the same purpose—namely, to afford a stop whereby the loaded wagon shall be retained in position by the hind wheels thereof resting in front of the hinged flooring-plank when the latter is thrown open. A portion of the platform, near the rear end thereof, forms a trap-door 5, the sides of which are firmly connected with a pair of arms 6 6, which extend forwardly and are hingedly connected with the platform. A pair of frames 7 7 are provided, one at each side of the platform, and to the upper crossbars of said frames are connected flexible hoisting elements 8 8, which are guided over pulleys 9 9 or other suitable guiding elements near the rear ends of the arms 6, thence over pulleys or guiding elements 10, supported near the upper front corners of the frame 7, and finally to winding-drums 11 upon a transverse shaft 12, which is suitably journaled transversely in the frame of the platform and which is preferably about flush with the flooring of said platform. It will be seen that by the rotation of the shaft the flexible hoisting elements will be wound upon the drums 11, and thus operate to elevate the tilting trap 5, which in practice is so disposed as to support the front wheels of a wagon driven upon the platform. It follows that when a wagon is thus tilted, its hind wheels being supported or checked by the flooring-strip 4, the front end of the wagon will be elevated, thus tilting the wagon sufficiently to enable its contents to escape through the rear end-gate.

The shaft 12 carries at one end thereof a worm-gear 13, normally meshing with a worm 14 upon a shaft 15, which is supported upon brackets 16, rising from the side of the platform. The boxing 17, which supports the front end of the shaft 15, is mounted pivotally upon trunnions 18, so as to enable the rear end of said shaft to move vertically. The rear end of the shaft is journaled in a boxing 19, which is free to slide vertically in its supporting-standard 16, the upper end of the latter being bifurcated for the accommodation of the box 19. In the bifurcated upper end of the standard 16 is pivotally mounted a cam 20, having a rearwardly-extending arm 21, which said cam normally presses against the upper side of the box 19 to depress the rear end of the shaft 15, and thus retain the worm 14 in operative connection with the worm-gear 13. The arm 21 of the cam has a perforated lug 22, which is connected by a link 23 with the rearward projecting end of the shaft 15. It will thus be seen that when the cam-arm 21 is elevated the cam 20 will be thrown out of engagement with the box 19 and at the same time the cam-arm 21 and link 23 will exercise a lifting action upon the rear end of the shaft 15, whereby the worm 14 will be thrown out of engagement with the worm-gear 13.

The shaft 15 carries near its front end a revoluble clutch member 24, having a sprocket-wheel 25 firmly connected therewith. Said shaft also carries a longitudinally-slidable clutch member 26, which is connected with the shaft 15 to rotate with the latter and which is provided with an annular groove 27.

28 designates a lever which is fulcrumed upon the side of the platform and which is provided with a bifurcated arm 29, engaging the annular groove 27 in the clutch member, which by manipulating said lever may be thrown into or out of engagement with the clutch member 24, carrying the sprocket 25. A spring 30 is provided, the tendency of which is to actuate the lever 28 and throw the clutch member 26 out of engagement with the clutch member 24.

31 designates a trip-lever which is fulcrumed on top of the platform adjacent to the lever 28 and extending through a keeper 32 upon the inner side of the latter, said trip-lever being provided with a catch 33, adapted to engage the said keeper to retain the lever 28 against the tension of the spring 30 in a position where the clutch members 26 and 24 are in operative engagement with each other. The rear end of the trip-lever 31 extends into the path of one of the arms 6, carrying the tilting trap 5. It follows that when said trap is elevated to a point at which the arm 6 engages the free end of the trip-lever the latter will be elevated, thus moving the catch 33 out of engagement with the keeper 32 of the lever 28 and causing the latter to be actuated by the spring 30 to disconnect the clutch members 26 and 24.

The cam 20 is operated by means of a rod 34, connecting the cam-arm 21 with the lever 28, which latter is provided with a perforation 35, through which the operating-rod extends, said rod being provided at its front end with a handle 36, by means of which it may be conveniently manipulated.

A brake mechanism for the shaft 12 is also provided, the same including a brake-strap 37, secured to a fixed point of the platform adjacent to the shaft 12, which latter is provided with a friction member 38, which may constitute the rim of one of the winding-drums. The free end of the strap 37 is connected, by means of a rod 39, with a hand-lever 40, fulcrumed upon the front end of the platform, where it is conveniently accessible.

The operation of this part of the invention will be readily understood. Power is transmitted to the clutch member 24 through the medium of a chain 41 engaging the sprocket-wheel 25. The latter rotates idly upon the shaft until the lever 28 is manipulated to spring the clutch member 26 into engagement with the clutch member 24. The shaft 15 is then rotated, and the worm 14 engaging the worm-gear 13 will rotate the shaft 12, winding upon the drums of the latter the flexible hoisting member 8, whereby the tilting trap 5 is elevated, thereby tilting a wagon which has been previously driven onto the platform. At a predetermined point, which may be determined by bending the handle of the lever 31 or by providing the latter with an adjustable element, such as a set-screw, which may be adjusted for engagement with the arm 6 of the tilting platform, the trip-lever 31 will be operated to throw the catch 33 out of engagement with the keeper 32 upon the lever 28, thus releasing the latter and causing it to be actuated by the spring 30, whereby the clutch members 26 and 24 will be thrown out of engagement. The tilting trap will remain in its tilted position, being supported by the worm 14 engaging the worm-gear 13. As soon as it is desired to lower the trap for the purpose of driving the wagon off the platform the cam 20 is operated by means of a rod 34. By pulling upon the latter the cam-arm 21 will be elevated and the cam 20 will be thrown out of engagement with the vertically-slidable box which supports the rear end of the shaft 15. The latter at the same time will be elevated by means of the link 23, which is connected with the cam-arm 21, and the worm 14 will thus be raised from engagement with the worm-gear 13, thus permitting the shaft to rotate freely by the descent of the tilting trap. The hand-lever 40, whereby the brake is operated, will be at the same time manipulated so as to check the descent of the tilting trap and avoid any violent and injurious concussion.

In connection with the dumping-platform is used a carrier and elevator which includes a truck T, comprising an axle 42 and forwardly-extending beams 43 and braces 44. The front ends of the beams 43 are connected on their under sides by a cross-piece 45, adapted to rest upon the ground, and by an inclined front piece 46, which coöperates with the cross-piece 45 to form a trough for the reception of the lower end of the elevator-casing 47. The latter is preferably made of sheet-steel, although, of course, other suitable material may be employed in the construction thereof, and it includes a grain-trough 48 and a bottom trough 49, suitably spaced from and connected with said grain-trough and which is for the purpose of accommodating the lower lead of the endless carrier mounted in the casing. The latter is provided at its lower end with a transverse shaft 50, whereby it is mounted in boxings 51 at the front ends of the beams 43, said shaft being provided between the sides of the casing with sprocket-wheels 52, supporting the lower ends of the endless chains 53, which are connected at intervals by slats 54 to constitute an endless carrier. The upper ends of the chains 53 are guided over sprocket-wheels 55, mounted upon a shaft 56, which is journaled in the sides of the casing at the upper end of the latter. I would have it understood that with regard to the detailed construction of the elevator-casing and the endless carrier no limitation is made beyond the fact that the casing is provided with an auxiliary trough for the accommodation of the lower lead of the endless carrier.

Pivotally mounted upon the axle of the elevator-truck is a frame 57, comprising uprights 58 and struts or braces 59. Suitably connected with the elevator-casing, at an intermediate point of the latter, is a cross-bar 60, connected with which is a pulley 61. Attached to the upper end of one of the uprights 58 is a rope or other suitable flexible hoisting element 62, which is guided over the pulley 61 and over another suitable guiding element, 63, which is mounted at the upper end of the upright 58 opposite to the one with which the end of the flexible hoisting element is connected. The hoisting element is guided through a slot 63' in the brace 59, connected with the upright 58, carrying the guiding element 63, and to a winding-drum 64, which is mounted upon a shaft 65, journaled in the said brace and upright and having a crank 66, by means of which it may be manipulated to wind a flexible hoisting element upon the drum. The latter is provided with a plurality of ratchets 67, any one of which may be engaged by a catch 68, pivotally mounted upon the upright 58. It will be seen that by this mechanism, by rotating the winding-drum 64 to wind the flexible hoisting element thereon, the free end of the elevator-casing will be elevated simultaneously with the pivotally-mounted frame 57 from the folded position which said elevator-casing and supporting-frame occupy upon the transporting-truck when folded for transportation. The parts may be sustained in any desired position with relation to each other by throwing the pawl or catch 68 into engagement with one of the ratchets 67 of the winding-drum. By this means the elevator-casing may be elevated to and sustained in any desired position within the limits of the dimensions of the parts.

The elevator-casing is provided near its lower end with a pair of upwardly-extending brackets 69, affording bearings for a transverse shaft 70, upon which is pivotally mounted a conveyer-casing 71, the outer end of which is provided with legs 72, whereby it may be sustained in operative position. The casing 71 is provided near its free end with a shaft 74, carrying a drum 75, which in conjunction with a similar drum 76, mounted upon the shaft 70, supports an endless carrier 77 of any suitable and appropriate construction. This carrier is driven by means of a chain 78, connecting a sprocket-wheel 79 upon the shaft 50 at the lower end of the elevator-casing with a sprocket-wheel 80 upon the shaft 70. The shaft 50 carries at its opposite end a sprocket-wheel 81, which when the device is placed in position for operation is operatively connected with the chain 41, leading from the sprocket-wheel 25 upon the clutch member 24, mounted revolubly upon the shaft 15, as already described. The carrier-casing 71 is provided with a flaring hopper 82, suitably connected with its upper edge for the purpose of guiding the material which is to be elevated to the carrier 77, to be conveyed by the latter to the elevator without danger of spilling. The rear side of the hopper 82 has a gap or opening 83, which is spanned by a suitably-constructed hinged member 84, which is provided with side flanges 85, adapted to engage and be supported upon the adjacent portions of the flared side of the hopper, said hinge member or guide-plate occupying a more nearly horizontal position than the flared sides of the hopper, so as to be less liable to be interfered with by the hind end of the wagon when the latter is tilted for the purpose of discharging its load into the carrier-casing 78.

In the operation of my invention the dumping-platform and the carrier-truck are properly placed and adjusted with relation to each other in such a manner that the elevator-casing when properly raised shall be disposed to discharge into the desired place of deposit and also in such a manner that the carrier-casing 71 shall be supported upon the front end of the dumping-platform in such a position that the chain 41 shall engage the sprocket-wheel 81 upon the shaft 78 at the lower end of the elevator-casing. Usually the weight of the respective parts will be sufficient to retain them securely in the desired position with relation to each other; but it is obvious that positive connecting means of any suitable kind may be employed whenever it shall be found desirable to do so. It will be seen that the carrier-casing 71 is capable of being folded over upon the elevator-casing, so as to rest upon the latter and to be out of the way when a loaded vehicle is driven onto the platform, which, owing to the slight elevation of the latter above the ground, may be very easily accomplished. After the wagon has been driven to the appropriate position, where it is secured by simply uplifting the hinged platform-plank 4, and then slightly backing the wagon, so as to cause its hind wheels to rest against said plank, the lever 28 and connecting-rod 34 are manipulated to throw the clutch members 26 and 24 into engagement and to lower the free end of the worm-carrying shaft 15 into engagement with the worm-gear 13, where it is retained by the pressure of the cam 20 upon the box 19. It will be premised that motion is imparted to the shaft 50, carrying the sprocket-wheel 79, from any suitable source of power by means of tumbling-rods connecting a protruding square end of said shaft with the main driven shaft or in any other convenient manner. The grain-carrying element may thereby be operated continuously, if desired, while the shaft 15 and the parts operated thereby will be operated intermittently, the duration of the operation of the shaft 15 being determined by the time when the clutch members 26 and 24 are thrown into operative engagement with each other through the medium of the handle 28 and the time when the latter is automatically tripped by the mechanism herein described. It is obvious, however, that the trip mechanism may be operated by hand by manipulating the free end of the trip-lever 31. Thus when a loaded wagon has been driven onto the platform and secured in position upon the latter the hinged carrier-casing 71 is first thrown over upon the rear end of the platform, where it is supported, the hinged guide-plate 84 being meanwhile folded down toward the carrier, so as not to interfere or collide with the wagon. The end-gate of the latter is now opened and the hand-lever 28 is manipulated to throw the shaft 15 into operation. The grain will pass from the wagon into the carrier-casing 71 and is conveyed from the latter to the elevator, whereby it is elevated and discharged into the place of storage. At the same time the tilting trap is gradually raised to elevate the front end of the wagon, thus causing its contents to be entirely discharged without necessity of manipulation with shovels and the like. It has been shown how the extent of the tilting of the wagon may be regulated and automatically checked at any predetermined point. It is also obvious that the several portions are capable of being completely governed in their relation to each other. Thus the tilting of the wagon need not commence until a portion of its load has been discharged. The tilting may be suspended at any desired moment by the manipulation of the lever 31 without regard to the point at which it would be automatically operated, and the entire device is in every respect simple and under the complete control of the operator.

Having thus described the invention, what is claimed is—

1. A dumping-platform having a tilting trap, a drum-carrying shaft, suitably-guided flexible members connecting the drums with the trap, a worm-gear upon the drum-carrying shaft, a driven shaft having a worm engaging the worm-gear, a movable box supporting one end of the shaft, a cam-lever fulcrumed adjacent to and bearing against said box, and a link connected with the cam-lever and engaging the driven shaft.

2. A drum-carrying shaft, a worm-gear on said shaft, a clutch-driven shaft having a worm engaging said worm-gear, a clutch-operating lever, a vertically-movable box supporting one end of the driven shaft, a cam-lever fulcrumed above and bearing against said box, a link connected with the cam-lever and engaging the driven shaft, and an operating-rod connected with the cam-lever and extending through a perforation in the clutch-operating lever.

3. A platform, a tilting trap connected with the same, a shaft mounted for rotation in the platform and having drums, suitably-guided flexible hoisting elements connecting said drums with the tilting platform to elevate the latter by the rotation of the shaft in one direction, a worm-gear upon said shaft, a suitably-supported shaft, vertically adjustable at one end and carrying near its movable end a worm meshing with the gear upon the drum-carrying shaft, a driven clutch member upon the worm-carrying shaft, a clutch member upon and rotatable with the worm-carrying shaft, a lever having a bifurcated arm engaging said movable clutch member, a spring actuating said lever to hold the clutch members upon the worm-carrying shaft out of engagement with each other, a keeper upon the clutch-operating lever, and a trip-lever extending through said keeper and having a stop adapted to engage the same to retain the clutch-operating lever, against the tension of the spring, in a position at which the clutch members shall be in operative engagement with each other.

In testimony that I claim the foregoing as my own I have hereto affixed my signature in the presence of two witnesses.

JOHN ROCKE.

Witnesses:
 DANIEL CLAUDON,
 C. B. MCVEY.